(12) United States Patent
Cory

(10) Patent No.: US 6,820,571 B2
(45) Date of Patent: Nov. 23, 2004

(54) MANUALLY OPERATED ANIMAL TRAINING DEVICE

(76) Inventor: George J. Cory, 230 W. Arroyo Ave., Ajo, AZ (US) 85321

( * ) Notice: Subject to any disclaimer, the term of this patent is extended or adjusted under 35 U.S.C. 154(b) by 0 days.

(21) Appl. No.: 10/378,457

(22) Filed: Mar. 3, 2003

(65) Prior Publication Data

US 2003/0136353 A1 Jul. 24, 2003

Related U.S. Application Data

(62) Division of application No. 10/059,857, filed on Jan. 28, 2002, now abandoned.
(60) Provisional application No. 60/264,529, filed on Jan. 26, 2001.

(51) Int. Cl.[7] .............................................. A01K 15/00
(52) U.S. Cl. ........................ 119/712; 119/665; 239/550; 239/327
(58) Field of Search ................................ 222/633, 429, 222/566; 239/207, 327, 356, 375, 392–393, 548, 550, 551, 565, 566; 119/712, 665, 702, 707; 47/1.5, 1.7; 132/114; 446/124, 125, 153, 176, 180, 472, 473

(56) References Cited

U.S. PATENT DOCUMENTS

| | | | |
|---|---|---|---|
| 907,376 A | * 12/1908 | La May | 222/633 |
| 1,451,260 A | * 4/1923 | Holland | 132/114 |
| 2,052,321 A | 8/1936 | Smart | |
| 2,532,001 A | * 11/1950 | Williams | 119/605 |
| 2,897,826 A | * 8/1959 | Di Vito | 132/114 |
| 3,072,097 A | 1/1963 | Morchand | |
| 3,086,384 A | * 4/1963 | Wyche | 70/447 |
| 3,457,928 A | * 7/1969 | Kurshenoff | 132/113 |
| 4,168,032 A | 9/1979 | Sneider | |
| 4,223,477 A | * 9/1980 | Abernathy | 47/1.5 |
| 4,258,714 A | 3/1981 | Leopoldi et al. | |
| 4,762,115 A | 8/1988 | Penner | |
| 4,991,777 A | 2/1991 | Sato | |
| 5,224,633 A | 7/1993 | Senart | |
| 5,501,179 A | 3/1996 | Cory | |
| 5,803,093 A | * 9/1998 | Romano | 132/116 |
| 6,270,012 B1 | 8/2001 | Dawson | |
| 6,327,998 B1 | 12/2001 | Andre et al. | |

FOREIGN PATENT DOCUMENTS

EP     0 451 062 A1     3/1991

* cited by examiner

Primary Examiner—Charles T. Jordan
Assistant Examiner—Kimberly S. Smith
(74) Attorney, Agent, or Firm—Snell & Wilmer L.L.P.

(57) ABSTRACT

A manually operated animal training device that can be combined with proven and traditional training methods includes means for providing a fluid spray to deter unwanted animal behavior.

4 Claims, 1 Drawing Sheet

MANUALLY OPERATED ANIMAL TRAINING DEVICE

CROSS REFERENCE TO RELATED APPLICATION

This application is a Divisional of U.S. patent application Ser. No. 10/059,857, filed Jan. 28, 2002 abandoned, and entitled "Manually Operated Animal Training Device" which claims priority to U.S. Provisional Application No. 60/264,529, filed Jan. 26, 2001.

FIELD OF INVENTION

The present invention generally relates to a manually operated humane method and apparatus for training an animal, such as a pet, from approaching, climbing, or destroying indoor furniture, outdoor furniture, counters and the like. The method and apparatus may also be used for training animals to cease exhibiting unwanted behaviors such as digging, barking, and biting/gnawing. The apparatus is based on surprising the animal or obtaining the animal's attention, thus deterring the animal, by manually spraying a fine mist of water on the animal or in the animal's direction without it being able to detect the means for delivering the spray mist.

BACKGROUND OF THE INVENTION

Domestic animals owned as pets, especially dogs and cats, have been known to cause harm to indoor furnishings, outdoor furnishings, plants, gardens, yards and the like by scratching, gnawing, biting, digging and in general having access to such objects. There is a present need for an efficient, inexpensive device for training animals in order to prevent them from damaging and/or destroying furnishings, landscaping, and other objects. The present invention is a humane device that is capable of frightening or surprising an animal in order to distract it from continuing its current damaging or unwanted behavior. The device is designed to be small in size and capable of being hidden out of sight from the animal, yet capable of delivering a sufficient amount of water to deter the animal from its actions without damaging fabrics, carpets, tile, wood or the like.

For many years, experts in animal training have thought to use a device which shoots water directly at an animal to deter it from approaching an object sought to be protected. In particular, many individuals have tried using toy guns and spray bottles which shoot water directly at an animal to deter it from approaching an object sought to be protected. In particular, many individuals have tried using toy water guns and spray bottles which shoot water directly at the approaching animal. Over time, the animal learns to associate the object which shoots the water, i.e. the toy gun or spray bottle, with the deterring water and the human actuating the toy water gun or spray bottle. The animal will then learn to recognize the presence of the toy water gun or spray bottle and the human prior to approaching the object. If the presence of the toy water gun or spray bottle and the human or other source of water is not noted by the animal, the animal will not be deterred and proceed to the unprotected object. Another problem associated with the use of toy water guns, spray bottles and water is that they tend to damage the surrounding furnishings due to the consolidated stream of water emitted from the toy water gun or spray bottle and the quantity of water emitted. Accordingly, there is exists a need for a device which is capable of being undetected by an animal, so as to lack the association with the means for deterring, without damaging surrounding furnishings.

A variety of means for deterring animals by delivering either water or noise are present in the prior art. For example, U.S. Pat. No. 5,009,192 discloses an animal deterrent apparatus for deterring animals in outdoor locations such as fields, gardens and nurseries. the device operates by sensing the approach of an animal within a predetermined distance and upon doing so activates an outdoor water sprinkler. U.S. Pat. No. 5,214,411 disclose an ultrasonic animal repelling apparatus which detects animals using an infrared sensor. Once detected, the apparatus emits a sound undetectable to humans but offensive to animals.

U.S. Pat. No. 4,969,418 discloses an animal training system which is based on the delivery of an electrical shock to the animal when it treads on a visible interdigital array mat. Further, U.S. Pat. No. 5,168,831 discloses a tacky surface animal repeller and U.S. Pat. No. 5,024,183 discloses an adaptation of the typical mouse trap. Also, U.S. Pat. No. 5,501,179 describes a deterrent device having a sensor for sensing the approach of an animal and upon sensing an animal, a means for activating a pump which produces a fine mist to deter the animal.

The prior art provides for various types of animal deterrent devices most all of which are automated for delivering a deterrent means upon sensing an approach or unwanted activity of an animal. Although these automated deterrent devices provide a watchful eye over a pet's unwanted behaviors while an owner cannot be present, many animals may learn the automated system and thereby circumvent its deterrent effect by avoiding the specific area of the device. Since animal training is most effective when actively repeating commands and issuing praise after positive outcomes, there is a need for a manually operable animal training device which deters unwanted animal behaviors in an efficient and humane manner.

SUMMARY OF THE INVENTION

The present invention is directed to a manually operable animal training device which deters animals from exhibiting unwanted behaviors by surprising the animal with a spray mist upon exhibiting the unwanted behavior. The spray mist is operated by a human user at a distance from where the unwanted behavior is occurring, but within eyesight of the unwanted behavior, so that the user can adjust the deterrent according to the animal's reaction and so that the animal will not associate the presence of the deterrent with the human user.

Briefly, the animal training device of the present invention includes at least one tube member having two ends with one end connected to a squeeze bulb capable of holding a reservoir of water and the other end connected to a nozzle member capable of emitting a fine mist of water when the pressure is applied to the squeeze bulb. The tubing may be hidden in furniture, gardens, or other objects with the nozzle positioned so that it is capable of emitting a stream of mist that can make contact with a target animal. The tubing must be long enough to enable a human user to be far enough away from the nozzle so that the animal does not associate the nozzle with the human's presence.

In another embodiment of the invention, a plurality of shorter tube members may each be perpendicularly connected to a longer tube member with "T" connectors. A plurality of nozzle members are then connected to the open unconnected ends of the shorter tube members and a squeeze bulb is attached to one end of the longer tube member while the opposite end of the longer tube member is sealed shut. This second embodiment of the training device can then be placed in objects such as between the mattress and box spring of a bed or underneath the cushions of a sofa or couch, for example, so that the nozzle members are barely visible from being located within the object. This embodiment allows a human user to train an animal to keep away from a larger object or area.

The method and training device of the present invention can also be used to deter digging, barking, chewing and gnawing if placed in a position where the animal typically performs these unwanted behaviors so that a user can reach the animal with a spray mist upon applying pressure to the bulb. The manual method and apparatus of the present invention is inexpensive and is also capable of being combined with traditional training which includes praising the animal once the animal stops the unwanted behavior.

These and other objects, features and advantages of the present invention will become more apparent to those skilled in the art from the following more detailed description of the preferred embodiments of the invention taken with reference to the accompanying figures.

DETAILED DESCRIPTION

Figure 1:
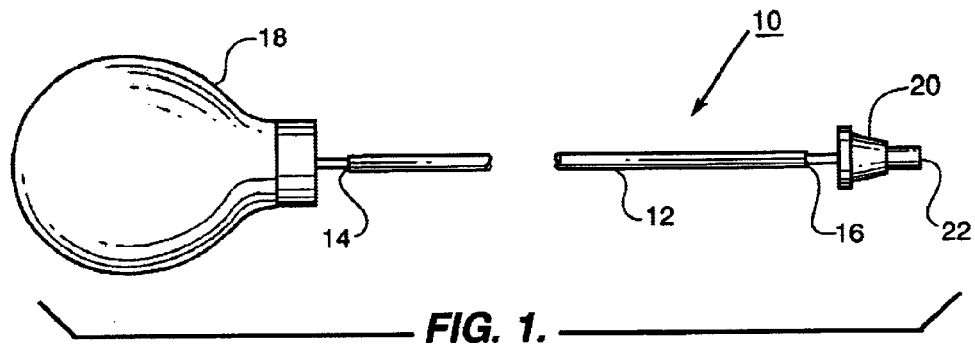
FIG. 1 is a side elevational view of a first exemplary embodiment of the animal training device of the present invention.

Referring particularly to the drawings, the elements of the device of the animal training device of the present invention are shown. In FIG. 1, a side elevational view of an exemplary embodiment of the animal training device 10 of the present invention is shown which includes a hollow tube member 12 having a first open end 14 and a second open end 16, a hollow bulb member 18 attached to the first open end 14 of the hollow tube member 12, and a nozzle member 20 attached to the second open end 16 of the hollow tube member 12.

The hollow tube member 12 is preferably comprised of a flexible material such as a flexible polymer that is wear resistant. Hollow tube member 12 may be comprised of any length but is preferably comprised of a length that is long enough to allow it to be hidden away in objects so that only nozzle member 20 is somewhat visible from the object. Hollow bulb 18 is capable of storing a reservoir of fluid, such as water, and is preferably also comprised of a flexible polymer so that fluid is forced through hollow tube member 12 and nozzle member 20 when pressure is applied to hollow bulb 18.

Nozzle member 20 is preferably comprised of a polymer and includes a fluid outlet 22 which emits a spray of fluid in direction X which can be adjusted much like the nozzle of a garden hose. In FIG. 1, fluid outlet 22 is adjacent to and in continuous alignment with the second open end 16 of hollow tube member 12. In use, hollow tube member 12 is hidden in an object such as a chair so that only nozzle member 20 is accessible. Nozzle member 20 is positioned where a fluid spray emitted from nozzle member 20 will be most likely to contact an animal that is exhibiting an unwanted behavior such as jumping on the chair. Hollow bulb member 18 is positioned away from the object, such as the chair, along with a portion of hollow tube member 12 so that a human user can apply pressure to hollow bulb 18 and emit a fluid spray that contacts the animal while being positioned well away from the animal. This way the animal does not associate the fluid spray with the human user. In that this is a manually operated training device, the device can be combined with tried and true traditional training methods such as providing praise to the animal when it stops the unwanted behavior.

Figure 2:
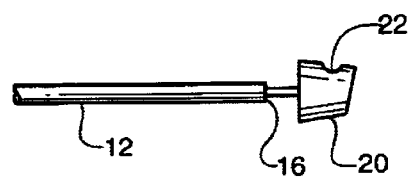
FIG. 2 is an alternative embodiment of the nozzle member of the present invention shown in FIG. 1.

Turning now to FIG. 2, an alternative embodiment of nozzle member 20 is shown which includes an outlet 22 for emitting fluid spray that is positioned on an outer side surface of nozzle 20. The outlet 22 is positioned perpendicular to the second open end 16 of hollow tube member 12.

Figure 3:
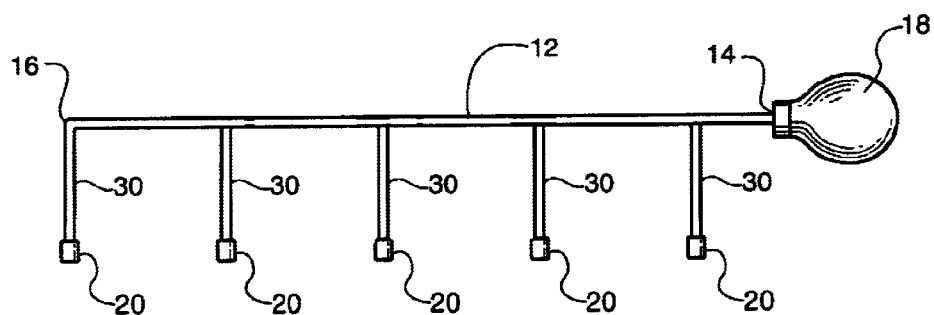
FIG. 3 is a side elevational view of a second exemplary embodiment of the animal training device of the present invention.
Figure 4:
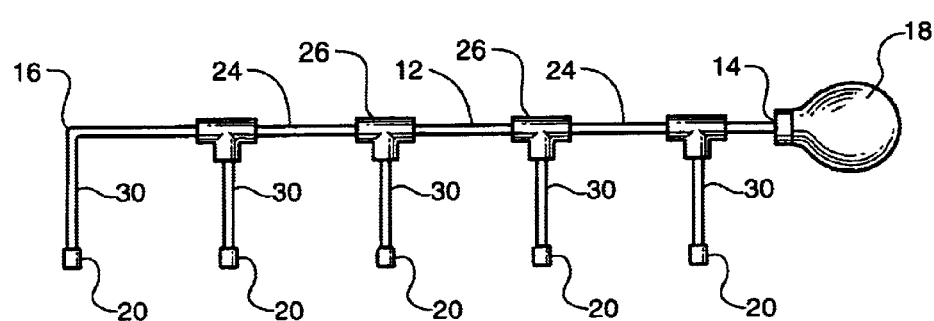
FIG. 4 is a side elevational view of another variation of the second exemplary embodiment of the animal training device of the present invention.

FIG. 3 illustrates another exemplary embodiment of the present invention which includes a plurality of hollow tubes 30 which extend perpendicularly from hollow tube member 12. The hollow interiors of hollow tubes 30 and hollow tube member 12 are in continuous communication with one another so that fluid can flow through all of the interiors of the tubes when pressure is applied to bulb member 18. In FIG. 3, the second open end of hollow tube member 12 is sealed. In this embodiment, hollow tube member 12 may comprise a plurality of hollow tube members 24 that are connected to hollow tubes 30 with connectors such as "T" type connectors 26 as shown in FIG. 4. Nozzle members 20 are attached to the ends of each of the hollow tubes 30 and are rotatable so that their respective outlets can be positioned differently from one another.

It will be apparent to those skilled in the art, that the foregoing detailed description of the exemplary embodiments of the present invention are representative of a type of animal training device within the scope and spirit of the present invention. Further, those skilled in the art will recognize that various changes and modifications may be made without departing from the true spirit and scope of the present invention. Those skilled in the art will recognize that the invention is not limited to the specifics as shown here, but is claimed in any form or modification falling within the scope of the appended claims. For that reason, the scope of the present invention is set forth in the following claims.

What is claimed is:

1. An animal training device comprising:

at least one hollow tube member having a first open end and a second closed end;

a hollow bulb member capable of storing a reservoir of fluid attached to the first open end of the hollow tube member;

a plurality of second hollow tubes each extending perpendicularly from and in continuous internal communication with the hollow tube member; and a plurality of rotatable nozzle members wherein a single nozzle member is connected to an open end of each second hollow tube.

2. The device of claim 1 wherein the at least one hollow tube member comprises a plurality of sequentially connected hollow tube members and the sequentially connected hollow tube members are connected to the second hollow tubes.

3. The device of claim 2 wherein the sequentially connected hollow tube members are connected to the second hollow tubes with hollow "T" connectors.

4. The device of claim 3 wherein each of said nozzle members includes an outlet for fluid spray positioned on an exterior side surface of the nozzle member.

* * * * *